United States Patent [19]  [11] 3,941,760
Herbeck et al. [45] Mar. 2, 1976

[54] MANUFACTURE OF PARTICULATE HOMOPOLYMERS OR COPOLYMERS OF ETHYLENE

[75] Inventors: Rudolf Herbeck, Frankenthal; Erich Kolk, Bad Durkheim; Guenther Schweier, Ludwigshafen; Hans Schick, Mannheim; Friedrich Urban, Limburgerhof, all of Germany

[73] Assignee: BASF Aktiengesellschaft, Ludwigshafen (Rhine), Germany

[22] Filed: June 13, 1974

[21] Appl. No.: 478,864

[30] Foreign Application Priority Data
June 19, 1973  Germany.............................. 2331103

[52] U.S. Cl. ... 260/94.9 C; 252/429 C; 260/88.2 R; 260/94.9 E
[51] Int. Cl.² ...................... C08F 4/02; C08F 10/02
[58] Field of Search .................... 260/88.2, 94.9 DA

[56] References Cited
UNITED STATES PATENTS

| | | | |
|---|---|---|---|
| 3,300,457 | 1/1967 | Schmid et al. ............... | 260/94.9 DA |
| 3,658,722 | 4/1972 | Delbouillo et al. .......... | 260/94.9 DA |
| 3,694,421 | 9/1972 | Vetter ......................... | 260/94.9 DA |
| 3,718,635 | 2/1973 | Tomoshige et al.......... | 260/94.9 DA |
| 3,773,688 | 11/1973 | Trieschmann et al. ...... | 260/94.9 DA |

FOREIGN PATENTS OR APPLICATIONS

| | | | |
|---|---|---|---|
| 601,919 | 7/1960 | Canada ....................... | 260/94.9 DA |
| 2,163,272 | 7/1972 | Germany...................... | 260/94.9 DA |

Primary Examiner—Edward J. Smith
Attorney, Agent, or Firm—Johnston, Keil, Thompson & Shurtleff

[57] ABSTRACT

Particulate polymers of ethylene are prepared by polymerization of ethylene or ethylene/α-monoalkene mixtures in a dry agitated bed (B) of the particulate polymer by means of a Ziegler/Natta catalyst system consisting of (1) a titanium-containing component and (2) an aluminum-containing component, the said components (1) and (2) being separately fed to the bed (B). Component (1) is a particulate reaction product (U) (of) (1.1) a substance of the formula $TiCl_3 \cdot (AlCl_3)_n$ where $n$ is a number equal to from 0 to 0.34, and (1.2) a reaction product (R) of phosgene and a substnace (S) obtained from a substance of the formula $Mg_6 \cdot Al_2 \cdot (OH)_{16} \cdot CO_3 \cdot (H_2O)_4$ by calcination (heating), provided that (R) has a chlorine content of from 10 to 76% by weight and (U) has been obtained by milling (1.1) and (1.2) together.

2 Claims, No Drawings

MANUFACTURE OF PARTICULATE HOMOPOLYMERS OR COPOLYMERS OF ETHYLENE

The present invention relates to a process for the manufacture of particulate ethylene homopolymers (HP) or ethylene copolymers (CP) containing up to 20% by weight of polymerized units of $C_{3-8}$ $\alpha$-monoalkenes, which polymers have a particle diameter of from 0.1 to 6 mm and are obtained by polymerization of ethylene or ethylene/$C_{3-8}$ $\alpha$-monoalkene mixtures in a dry agitated (e.g. stirred) bed (B) of particulate homopolymer (HP) or copolymer (CP) at temperatures of from 30° to 120°C and pressures of from $1 \times 10^5$ to $2 \times 10^7$ N/m² (Pascal) by means of a Ziegler/Natta catalyst system consisting of (1) a titanium-consisting component and (2) an aluminum ($C_{1-8}$ trialkyl) chloride or aluminum ($C_{1-8}$ dialkyl) chloride, provided that (I) the components (1) and (2) of the cataylst system are separately fed to the bed (B) and (II) the atomic ratio of titanium in component (1) to aluminum in component (2) is from 1:0.1 to 1:1,000.

Processes of this kind, i.e. processes involving dry-phase polymerization, are of great industrial interest, since they dispense with the use of a liquid medium such as is essential in the corresponding solution or suspension polymerization processes, and is thus a more economical technique.

However, the said advantage pertaining to prior art processes for dry-phase polymerizations is offset by a certain drawback, namely the tendency of the particulate polymers to be formed in a relatively broad spectrum of particle sizes showing, in particular, a relatively high proportion of relatively very small particles.

One disadvantage of the "fines" (granules of a particle size $\leq 0.5$ mm) is that they diminish the intensity of mixing of the dry bed (B) and thus reduce the essential dissipation of the heat of polymerization and impair the distribution of the catalyst system, all to a drastic extent, which may lead to complete cessation of mixing of the bed (B) and instead, in the case of a stirred bed (B), cause simple rotation of the entire bed (B), with the result that polymerization breaks down.

Even if suitable measures (e.g. modifications to the apparatus) were effected to overcome the said difficulties of stirring the bed (B), the large portion of fines remains a disadvantage, since it is a general nuisance in all processes involving the use of the polymer, because it hinders the feed of the polymer to screw machines and tends to cause air-trapping.

It is an object of the present invention to provide a process of the above kind which is capable of producing products having a much lower content of fines.

We have found that this object may be achieved by using, in the process, a catalyst system in which the titanium-containing component (1) is one which has been prepared in a specific manner from specific starting materials.

The present invention relates to a process for the manufacture of particulate ethylene homopolymers (HP) or ethylene copolymers (CP) containing up to 20% by weight of polymerized units of $C_{3-8}$ $\alpha$-monoalkenes, which polymers have a particle size of from 0.1 to 6 mm and are obtained by polymerization of ehtylene or ethylene/$C_{3-8}$ $\alpha$-monoalkene mixtures in a dry agitated (in particular stirred bed (B) of particulate homopolymer (HP) or copolymer (CP) at temperatures of from 30° to 120°C and in particular from 70° to 110°C and pressures of from $1 \times 10^5$ to $2 \times 10^7$ and in particular from $2 \times 10^6$ to $6 \times 10^6$ N/m² (Pascal) by means of a Ziegler/Natta catalyst system consisting of (1) a titanium-containing component and (2) an aluminum ($C_{1-8}$ trialkyl) or aluminum ($C_{1-8}$ dialkyl chloride, provided that (I) the components (1) and (2) of the catalyst system are separately fed to the bed (B) and (II) the atomic ratio of titanium in component (1) to aluminum in component (2) is from 1:0.1 to 1:1,000 and in particular from 1:100 to 1:300. The process of the invention is characterized in that the titanium-containing component (1) of the catalyst system is a particulate reaction product (U) having a particle diameter of from 0.1 to 2,000/um and obtained from 1.1. a substance of the formula $TiCl_3 \cdot (AlCl_3)_n$, where n is a number equal to from 0 to 0.34, and 1.2. a reaction product (R) of phosgene and a substance (S) which has been obtained from a substance of the formula $Mg_6 \cdot Al_2 \cdot (OH)_{16} \cdot CO_3 \cdot (H_2O)_4$ ba calcination (heating) at a temperature of from 100° to 600°C and in particular from 250° to 300°C for from 1 to 100 hours and in particular from 20 to 30 hours, provided that (III) the reaction product (R) has been obtained by allowing phosgene to act on the substance (S) at a temperature of from 80° to 350°C and preferably from 250° to 300°C until the reaction product (R) has a chlorine content of from 10 to 76% and preferably from 50 to 65% by weight and (IV) the reaction product (U) has been obtained by milling its components (1.1) and (1.2) together in a ratio of from 1:2 to 1:200 and preferably from 1:10 to 1:20, by weight, over a period of time ranging from 5 to 100 hours and preferably from 10 to 20 hours, the milling acceleration being from 4 to 6 m/s².

If desired, the process may be carried out in the presence of up to 50% molar of hydrogen (based on the monomer or monomer mixture to be polymerized), which then serves to control the molecular weight of the polymers.

It has been found that the process of the invention not only makes it possible to obtain products showing a particularly low content of fines but also permits regulation of the molecular weight of the polymers by means of hydrogen in a particularly favorable manner. Furthermore, the polymers are obtained in surprisingly high yields (per unit weight of catalyst system per unit time), even at relatively low temperatures, and there is generally no need to remove the residues of catalyst system from the products.

The following are details of the method of carrying out the process of the invention.

As far as the non-characterizing measures are concerned, these may be carried out in conventional manner within the limits stated in the above definition, and there is no need to consider them further in this specification. Reference is made, for example, to German Patent No. 1,008,000 and German Published Application No. 1,795,109, in which dry-phase polymerization is described, and to German Published Application No. 1,805,765, in which the separate introduction of components (1) and (2) of the catalyst system to the bed (B) is dealt with, and also to German Published Application No. 1,420,503, which relates to the control of molecular weight of the polymers by means of hydrogen.

In this context it may be mentioned that the process of the invention operates in a particularly advantageous manner when carried out using, as component (2) of the catalyst system, aluminumtrialkyl such as, in particular, aluminumtriethyl and aluminumtriisobutyl. It may also be pointed out that particularly suitable comonomers for the ethylene in the present process are the following α-monoalkenes: propylene, butene-1 and hexane-1.

Finally, it may be mentioned that the process may be carried out batchwise but is advantageously carried out continuously.

As regards the characterizing part of the process of the invention, it may be stated that the two primary starting materials mentioned in said characterizing clause are known per se. One of the primary starting materials is a substance of the formula $TiCl_3 \cdot (AlCl_3)_n$, where n is a number ranging from 0 to 0.34. These are substances such as are conventionally used in Ziegler/Natta catalyst xystems and are commercially available, particular examples being titanium trichloride and mixed compounds of titanium trichloride and aluminum trichloride, preferably titanium trichloride itself and substances of the formula $TiCl_3 \cdot \frac{1}{3} AlCl_3$. The other primary starting material is a substance of the formula $$Mg_6 \cdot Al_2 \cdot (OH)_{16} \cdot CO_3 \cdot (H_2O)_4.$$

This substance is readily available, for example by following the instructions given in German Published Application No. 2,024,282.

The primary starting material of the formula $$Mg_6 \cdot Al_2 \cdot (OH)_{16} \cdot CO_3 \cdot (H_2O)_4$$

is first calcined under the specific conditions defined above, which conditions embrace, for example, the mode of operation as described in the cited German Published Application No. 2,024,282, appropriately modified. The substance (S) obtained after calcination is then subjected to the action of phosgene under the specific conditions defined above. This may be effected in the manner normally used for chlorinating oxidic metal compounds by means of phosgene, within the said limits.

For the purposes of the present invention, the chlorination of the calcined substance (S) must be carried to a point at which the reaction product (R) of the phosgene and calcined substance (S) has a chlorine content of from 10 to 76% and in particular from 50 to 65%, by weight. This point may be readily determined on samples taken at intervals and examined by the usual methods of chloride analysis.

The titanium-containing component (1) of the catalyst system, which is the characterizing feature of the process of the invention, is a particulate reaction product (U) of the subcomponents (1.1) and (1.2), i.e. a substance of the formula $TiCl_3 \cdot (AlCl_3)_n$ explained above and the reaction product (R) also explained above, this reaction product (U) being obtained by milling said subcomponents (1.1) and (1.2) together under specific conditions as stated above. This milling generally presents no difficulties and may be carried out in conventional mills provided they can be operated at a milling acceleration of from 4 to 6 m/s², as is possible, for example, in the case of ball mills. It will be appreciated that when operating according to the invention the safety precautions normally met when handling Ziegler/Natta catalyst systems or their components will be employed, for example the use of a protective gas and the substantial exclusion of moisture.

In the following Examples, the titanium-containing component (1) of the catalyst system used is a particulate reaction product (U) having a particle size of from 0.1 to 2,000μm and obtained from 1.1. a substance of the formula $TiCl_3 \cdot \frac{1}{3} AlCl_3$ commercially available for Ziegler/Natta catalyst systems and
1.2. a reaction product (R) of phosgene and a substance which has been obtained from a substance of the formula $$Mg_6 \cdot Al_2 \cdot (OH)_{16} \cdot CO_3 \cdot (H_2O)_4$$

by calcining (heating) for 24 hours at a temperature of 280°C, the conditions being that (III) the preparation of the reaction product (R) has been effected by allowing phosgene to act on the substance (S) at a temperature of 280°C for a sufficiently long period (24 hours) for the reaction product (R) to have a chlorine content of 65% by weight and (IV) the reaction product (U) has been obtained by milling its components (1.1) and (1.2) together in a ratio of 1:10 by weight over a period of 16 hours ane at a milling acceleration of 5.2 m/s² (vibratory ball mill under nitrogen).

Furthermore, the following Examples involve continuous operation using a conventional polymerization reactor having a volume of 200 l and provided with a stirrer and having, in its cover, feed means for component (1) of the catalyst and, in its side wall, feed means for component (2) of the catalyst system. During continuous operation, a dry agitated bed (B) of particulate polymer is maintained within the reactor, this filling the reactor to an extent of about 70% of its volume.

EXAMPLE

During continuous polymerization, a pressure of 3.4 × 10⁶ N/m² (Pascal) is maintained in the reactor by automatic control means. The pressure is produced by ethylene. Component (1) of the catalyst system is automatically and continuously fed to the reactor at a rate of 0.075 g/hr and triethylaluminum is fed, as component (2) of the catalyst system, at a rate of 1.0 g/hr (this corresponding to an atomic ratio of titanium in component (1) to aluminum in component (2) of 1:235). The polymerization temperature is 85°C. In this way, 4.6 kg/hr of polymer having a bulk density of 388 g/l are obtained. The particle size distribution of the resulting polymer is given in the following Table.

TABLE

| Particle size (mm) | % w/w |
|---|---|
| 6 – 4 | 1.0 |
| 4 – 3 | 2.2 |
| 3 – 2 | 8.1 |
| 2 – 1 | 40.7 |
| 1 – 0.5 | 31.7 |
| 0.5 – 0.4 | 5.0 |
| 0.4 – 0.3 | 6.1 |
| 0.3 – 0.2 | 3.3 |
| 0.2 – 0.1 | 1.9 |

EXAMPLE 2

During continuous polymerization, a pressure of 3.4 × 10⁶ N/m² (Pascal) is maintained in the reactor by automatic control means. The pressure is produced by a mixture of ethylene (77% v/v) and hydrogen (23% v/v). Component (1) of the catalyst system is fed to the reactor automatically and continuously at a rate of 0.2 g/hr and triethylaluminum, as component (2) of the catalyst system, is fed at a rate of 2.96 g/hr (equivalent to an atomic ratio of titanium in component (1) to aluminum in component (2) of 1:258). The polymerization temperature is 70°C. In this way, 4.4 kg/hr of polymer having a bulk density of 371 g/l are obtained. The particle size distribution of the resulting polymer is given in the following Table.

TABLE

| Particle size (mm) | % w/w |
|---|---|
| 6 – 4 | 0.5 |
| 4 – 3 | 2.0 |
| 3 – 2 | 7.7 |
| 2 – 1 | 41.4 |
| 1 – 0.5 | 40.1 |
| 0.5 – 0.4 | 4.5 |
| 0.4 – 0.3 | 2.3 |
| 0.3 – 0.2 | 1.1 |
| 0.2 – 0.1 | 0.4 |

EXAMPLE 3

During continuous polymerization, a pressure of 3.4 × 10⁶ N/m² (Pascal) is maintained in the reactor by automatic control means. The pressure is produced by a mixture of ethylene (90.5% v/v) and hydrogen (9.5% v/v). Component (1) of the catalyst system is fed to the reactor automatically and continuously at a rate of 0.225 g/hr and triethylaluminum, as component (2) of the catalyst system, is fed at a rate of 2.56 g/hr (equivalent to an atomic ratio of titanium in component (1) to aluminum in component (2) of 1:203). The polymerization temperature is 100°C. In this way, 7.4 kg/hr of polymer having a bulk density of 374 g/l are obtained. The particle size distribution of the resulting polymer is given in the following Table.

TABLE

| Particle size (mm) | % w/w |
|---|---|
| 6 – 4 | 0.5 |
| 4 – 3 | 0.6 |
| 3 – 2 | 5.3 |
| 2 – 1 | 41.2 |
| 1 – 0.5 | 39.4 |
| 0.5 – 0.4 | 4.3 |
| 0.4 – 0.3 | 4.7 |
| 0.3 – 0.2 | 3.1 |
| 0.2 – 0.1 | 0.9 |

EXAMPLE 4

During continuous polymerization, a pressure of 3.4 × 10⁶ N/m² (Pascal) is maintained in the reactor by automatic control means. The pressure is produced by a mixture of ethylene (87.7% v/v), butene-1 (1.4% v/v) and hydrogen (10.9% v/v). The component (1) of the catalyst system is fed to the reactor automatically and continuously at a rate of 0.225 g/hr and triethylaluminum, as component (2) of the catalyst system, is fed at a rate of 2.28 g/hr (equivalent to an atomic ratio of titanium in component (1) to aluminum in component (2) of 1:180). The polymerization temperature is 90°C. In this manner, 6.7 kg/hr of polymer having a bulk density of 338 g/l are obtained. The particle size distribution of the resulting polymer is given in the Table below.

TABLE

| Particle size | % w/w |
|---|---|
| 6 – 4 | 1.6 |
| 4 – 3 | 4.0 |
| 3 – 2 | 13.5 |
| 2 – 1 | 54.4 |
| 1 – 0.5 | 23.5 |
| 0.5 – 0.4 | 1.5 |
| 0.4 – 0.3 | 0.7 |
| 0.3 – 0.2 | 0.5 |
| 0.2 – 0.1 | 0.3 |

EXAMPLE 5

During continuous operation, a pressure of 3.4 × 10⁶ N/m² (Pascal) is maintained in the reactor by automatic control means. The pressure is porduced by a compressed mixture of ethylene (87.5% v/v), butene-1 (6.4% v/v) and hydrogen (6.1% v/v). The component (1) of the catalyst system is fed to the reactor automatically and continuously at a rate of 0.158 g/hr and triethylaluminum, as component (2) of the catalyst system, is fed at a rate of 1.56 g/hr (equivalent to an atomic ratio of titanium in component (1) to aluminum in component (2) of 1:194). The polymerization temperature is 90°C. In this manner, 5.2 kg/hr of polymer having a bulk density of 340 g/l are obtained. The particle size distribution of the resulting polymer is given in the following Table.

TABLE

| Particle size (mm) | % w/w |
|---|---|
| 6 – 4 | 6.0 |
| 4 – 3 | 15.4 |
| 3 – 2 | 43.5 |
| 2 – 1 | 30.7 |
| 1 – 0.5 | 3.5 |
| 0.5 – 0.4 | 0.4 |
| 0.4 – 0.3 | 0.2 |
| 0.3 – 0.2 | 0.2 |
| 0.2 – 0.1 | 0.1 |

We claim:

1. A process for the manufacture of particulate ethylene homopolymers (HP) or ethylene copolymers (CP) containing up to 20% by weight of polymerized units of $C_{3-8}$ α-monoalkene, which polymers have a particle size of from 0.1 to 6 mm and are obtained by polymerization of ethylene or ethylene/$C_{3-8}$ α-monoalkene mixtures in a dry, agitated bed (B) of particulate homopolymer (HP) or copolymer (CP) at temperatures of from 30° to 120°C and pressures of from 1 × 10⁵ to 2 × 10⁷ N/m² (Pascal) by means of a Ziegler/Natta catalyst system consisting of (1) a titanium-containing component and (2) an aluminum ($C_{1-8}$ trialkyl) or aluminum ($C_{1-8}$ dialkyl) chloride, provided that (I) the components (1) and (2) of the catalyst system are separately fed to the bed (B) and (II) the atomic ratio of titanium in component (1) to aluminum in component (2) is from 1:0.1 to 1:1,000, wherein the titanium-containing component (1) of the catalyst system is a particulate reaction product (U) having a particle diameter of from 0.1 to 2,000 μm and obtained from 1.1. a substance of the formula $TiCl_3 \cdot (AlCl_3)_n$, where n is a number equal to from 0 to 0.34, and
 1.2. a reaction product (R) of phosgene and a substance (S) which has been obtained from a substance of the formula $Mg_6 \cdot Al_2 \cdot (OH)_{16} \cdot CO_3 \cdot$ ($H_2O)_4$ by calcination (heating) at a temperature of from 100° to 600°C for from 1 to 100 hours, provided that (III) the reaction product (R) has been obtained by allowing phosgene to act on the substance (S) at a temperature of from 80° to 350°C until the reaction product (R) has a chlorine content of from about 50 to 65% by weight and (IV) the reaction product (U) has been obtained by milling its components (1.1) and (1.2) together in a vibratory ball mill in a ratio of from 1:2 to 1:200 by weight over a period of time ranging from 5 to 100 hours, the milling acceleration being from 4 to 6 $m/s^2$.

2. A process as set forth in claim 1 wherein particulate ethylene homopolymers (HP) are produced by polymerizing ethylene in the stated manner.

* * * * *